United States Patent Office 3,475,114
Patented Oct. 28, 1969

3,475,114
MODIFICATION OF KERATIN FIBERS WITH ETHYLENICALLY UNSATURATED COMPOUNDS IN THE PRESENCE OF AQUEOUS SOLUTIONS OF FIBER SWELLING AGENTS
Edgar Dare Bolinger and Willard L. Morgan, Spartanburg, S.C., assignors to Deering Milliken Research Corporation, Spartanburg, S.C., a corporation of Delaware
No Drawing. Filed Dec. 6, 1962, Ser. No. 242,605
Int. Cl. D06m 3/00, 13/34
U.S. Cl. 8—127.5                                    13 Claims This invention relates to an improvement in the process of reacting monomers containing a $$CH_2=C-$$

group with fibrous substrates and, more particularly, relates to an improvement in such a process whereby the amount of reaction product formed is increased without a corresponding decrease in aesthetic properties of the substrate.

Various monomeric readily polymerizable compounds containing the $$CH_2=C-$$

group have been reacted with wool fabrics in an effort to shrinkproof the fabric. The technique by which these monomeric materials have been reacted with the wool fabric has become known as graft polymerization, whereby the monomer reacts with the fibers in the fabric and polymerizes, at least one end of the polymer chain being chemically attached to the fibers. This type grafting is believed to occur in the presence of water and various catalysts, or initiators, for the polymerization of these monomeric compounds.

While the shrinkage properties of wool fabrics has been reduced by such techniques, the deposition of the polymers within the fibers of the fabric has greatly diminished the aesthetic properties of the fabric. For example, the hand, drape and general appearance of fabrics which have been treated in this manner are considerably diminished, in some instances to the extent of providing a very harsh and even boardy fabric. For this reason, the graft polymerization technique has generally been considered unfeasible for commercially reducing the shrinkage properties of fabrics containing wool fibers.

It is an object of this invention to improve the graft polymerization process whereby monomeric readily polymerizable compounds containing the $$CH_2=C-$$

group are reacted with wool fabrics without the corresponding diminution of aesthetic properties.

It is a further object of this invention to provide a graft polymerization process whereby greater amounts of compounds containing the $$CH_2=C-$$

can be reacted with keratin fibers.

These and other objects are accomplished in accordance with this invention by conducting the reaction while the fibers of the fibrous substrate are in a swollen condition, such as is provided when the fibers are treated with a swelling agent for keratin fibers.

Urea constitutes the most readily available and desirable swelling agent, although any other material which will swell keratin fibers, preferably in an aqueous medium, is suitable. For example, guanidine compounds, such as the hydrochlorides; amides, such as formamide, N,N'-dimethylformamide, acetamide, N,N'-dimethylacetamide and the like; thiourea; phenol; lithium salts, such as the chloride, bromide and iodide and the like are similarly useful.

Graft polymerization procedures are generally conducted in the presence of a catalyst system, most preferably a redox catalyst system. This latter type system includes a reducing agent and oxidizing agent which interact to form free radicals which initiate the chemical attachment of the monomer to the fibrous substrate and subsequent polymerization.

The desired swollen state may be effected by treating with the swelling agent prior to, or simultaneously with, any one of the catalyst components or the monomeric materials. Alternatively, the swelling agent may be incorporated with the first component of the catalyst system, when the two components are applied separately or the swelling agent may be incorporated in the aqueous system containing both catalyst components when these components are applied to the fibrous substrate simultaneously. Any order of addition is suitable, but it is generally preferred that the fibers be in a swollen state from the outset of the treatment.

Optimum swelling effects are obtained when the swelling agent is applied to the fibrous substrate in an aqueous medium although organic solvents may be utilized if desired.

It has been found that the use of the swelling agent in accordance with this invention enables the practitioner to apply a greater amount of polymeric material to the fibrous substrate than would be obtained under the same condition without the use of a swelling agent, thus enhancing the effect of the polymeric material on the properties of the substrate. Most surprisingly, however, this increased weight is obtained without a corresponding increased loss of aesthetic properties such as hand, and appearance. While there is no clear explanation for this phenomenon, it appears that the polymeric material is preferentially deposited within the individual fibers of the fibrous substrate when the graft polymerization process is conducted in the presence of the swelling agent, thereby diminishing the undesirable effects produced when excessive amounts of homopolymer (i.e., that polymeric material formed during the process but which is not chemically attached to the fibrous substrate) are deposited on the exterior surfaces of the individual fibers of the substrate.

It has also been found that the ability to increase the amount of polymer diminishes as the concentration of the swelling agent exceeds a certain critical level for each system selected. For example, increased levels of polymer are readily obtained when the concentration of swelling agent in the aqueous medium increases up to about 35% by weight. When this concentration is exceeded, however, the level of polymer decreases considerably. It is preferred, therefore, that the concentration of the swelling agent in the aqueous medium in which the fibrous substrate is treated be maintained below about 35% by weight.

Any redox catalyst system suitable for the polymerization of ethylenically unsaturated compounds is suitable for use in accordance with this invention.

The reducing agent may be an iron compound such as the ferrous salts including ferrous sulfate, acetate, phosphate, ethylenediamine-tetra-acetate; metallic formaldehyde sulfoxylates, such as zinc formaldehyde suffoxylate; alkali-metal sulfoxylate, such as sodium formaldehyde sulfoxylate; alkali-metal sulfites, such as sodium or potassium bisulfite, sulfite, metabisulfite or hydrosulfite; mercaptan acids, such as thioglycollic acid and its water-soluble salts, such as sodium, potassium or ammonium thioglycollate; mercaptans, such as hydrogen sulfide and sodium or potassium hydrosulfide; alkyl mercaptans, such as butyl or ethyl mercaptans and mercaptan glycols, such as beta-mercaptoethanol; alkanolamine sulfites, such as ethanolamine sulfite and isopropanolamine sulfite, ammonium bisulfite, sodium hydrosulfide, cysteine hydrochloride, sodium thiosulfate, sulfur dioxide, sulfurous acid and mixtures of these reducing agents. In addition, a salt of hydrazine may be used as the reducing agent, the acid moiety of the salt being derived from any acid, such as hydrochloric, hydrobromic, sulfuric, sulfurous, phosphoric, benzoic, acetic and the like.

Suitable oxidizing agents for use in the redox catalyst system, include inorganic peroxides, e.g., hydrogen peroxide, barium peroxide, magnesium peroxide, etc., and the various organic peroxy catalysts, illustrative examples of which are: the dialkyl peroxides, e.g., diethyl peroxide, dipropyl peroxide, dilauryl peroxide, dioleyl peroxide, distearyl peroxide, di-(tert.-butyl) peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e.g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc.; unsymmetrical or mixed diacyl peroxides, e.g., acetyl benzoyl peroxide, propionyl benzoyl peroxide, etc.; terpene oxides, e.g., ascaridole, etc.; and salts of inorganic peracids, e.g., ammonium persulfate, sodium persulfate, potassium persulfate, sodium percarbonate, potassium percarbonate, sodium perborate, potassium perborate, sodium perphosphate, potassium perphosphate, etc.

Other examples of organic peroxide initiators that can be employed are the following: Tetralin hydroperoxide, tert.-butyl diperphthalate, cumene hydroperoxide, tert.-butyl perbenzoate, 2,4-dichlorobenzoyl peroxide, urea peroxide, caprylyl peroxide, p-chlorobenzoyl peroxide, 2,2-bis(tert.-butylperoxy) butane, hydroxyheptyl peroxide, diperoxide of benzaldehyde, and the like.

The above oxidizing agents, particularly the salts of inorganic peracids, may be utilized alone to initiate the graft polymerization process, although faster reactions at lower temperatures may be conducted when the oxidizing agent is combined with a reducing agent to form a redox catalyst system. Also, ferric salts can be used as oxidizing agents and form a redox catalyst system with hydrogen peroxide, in which case the peroxide functions as a reducing agent.

Other suitable catalysts or initiators for the polymerization process include azo catalysts, such as azobisisobutyronitrile, as well as irradiation under the influence of high energy fields, including the various, diverse actinic radiations, such as ultraviolet, X-ray and gamma radiations, as well as radiation from radioactive materials, such as cobalt-60.

In conducting the graft polymerization process, both the reducing agent and oxidizing agent may be applied to the fibrous substrate prior to the application to the substrate of the monomeric material or vice versa or simultaneously therewith. In general, however, it is preferred to add either the reducing agent or the oxidizing agent to the fibrous substrate and then subsequently to add the other catalyst component and the monomeric material simultaneously. For example, a substrate can first be impregnated with a solution of a reducing agent and then immersed in an aqueous solution containing the oxidizing agent and the desired monomeric material.

Regardless of the order of addition of the catalyst components and the monomeric material, it is generally preferred that the fibrous substrate be in a swollen condition throughout the treatment.

A swelling agent may be utilized in accordance with this invention to improve the polymerization onto a kera- tin substrate of any readily polymerizable monomeric compound containing a

group. These monomeric materials include N-dialkyl acrylamides, e.g., N,N'-dimethyl, -diethyl, -dipropyl, -dibutyl, -diamyl, -dihexyl, -dioctyl, etc., acrylamides; N-(p-anisyl) methacrylamide, N-(p-chlorophenyl) methacrylamide, N-phenyl methacrylamide, N-ethylmethylmethacrylamide, N-methylmethacrylamide, N-(p-tolyl) methacrylamide and the like; the acrylic, alpha-alkyl acrylic and alpha-haloacrylic esters of saturated monohydric alcohols, for instance saturated aliphatic monohydric alcohols, e.g., the methyl, ethyl, propyl, isopropyl, butyl, isobutyl, amyl, etc., esters of acrylic, methacrylic, ethacrylic, propacrylic, chloroacrylic, bromoacrylic, aconitic, itaconic, maleic, crotonic, fumaric, etc., acids; these latter type acids and anhydrides thereof; the phenyl, benzyl, phenylethyl, etc., esters of the aforementioned acids; vinyl aromatic compounds, e.g., styrene; methylstyrenes, such as o-, m-, p-methylstyrene; dimethylstyrenes, such as 2,5-dimethylstyrene; halogenated styrenes, such as m-bromostyrene, p-bromostyrene, p-iodostyrene, pentachlorostyrene, α,β,β-trifluorostyrene, 2,5-bis (trifluoromethyl) styrene, 3-trifluoromethylstyrene dichlorostyrene and the like; the various cyanostyrenes, the various methoxystyrenes, e.g., p-methoxystyrene vinyl naphthalenes, e.g., 4-chloro-1-vinylnaphthalene, 6 - chloro-2-vinylnaphthalene, etc.; vinyl and vinylidene halides, e.g., vinyl and vinylidene chlorides, bromides, etc.; alkyl vinyl ketones, e.g., methyl vinyl ketone, ethyl vinyl ketone, methyl isopropenyl ketone, etc.; itaconic and maleic diesters containing a single

group, e.g., the dimethyl, diethyl, di-β-chloroethyl, diethylchloro, dipropyl, diisopropyl, dibutyl and other saturated aliphatic monohydric alcohol diesters of itaconic and maleic acid, diphenyl itaconate and maleate, dibenzyl itaconate and maleate, di-(phenylethyl) itaconate and maleate, etc.; vinyl, allyl, and methallyl esters of saturated aliphatic monocarboxylic acids, e.g., vinyl, allyl and methallyl acetates, vinyl, allyl and methallyl propionates, vinyl, allyl and methallyl valerates, etc.; vinyl thiophene; vinyl pyridine; vinyl pyrrole; nitriles containing a single

grouping, e.g., acrylonitrile, methacrylonitrile, etc.

Additional suitable ethylenically unsaturated compounds include: 1-acetoxy-1,3 - butadiene, acrolein; allyltriethoxysilane; N - benzylidene - 4 - methacryloxyaniline; bis(trimethylsiloxy) vinylmethylsilane; β-bromovinyl ethyl ether; 1,3-butadiene; 2-butenyltriethoxysilane; n-butyl cinnamate; n-butyl crotonate; N-butyl crotonate; N-butyl maleimide; n-butyl vinyl ether; tert-butyl vinyl ether, n-butyl vinylsulfonate; 2- chloroallyl acetate; 2-chloroallyl alcohol; α-chlorovinyltriethoxysilane; citraconic anhydride; crotonaldehyde, crotonic acid; 1-cyano-1,3-butadiene; diallyl phthalate; 4, 6-diamino-2-vinyl-s-triazine; 2,3-dichloro-1,3 - butadiene; diethoxyethylvinylsilane; diethoxymethylvinylsilane; diethoxyphenylvinylsilane; diethylaminoethyl methacrylate; diethyleneglycol monovinyl ether; diethyl fumarate; diethylvinylphosphonate; 1,1-dihydroperfluorobutyl acrylate; N-(1,1-dihydroperfluorobutyl)-N-ethyl acrylamide; dimethallyl oxalate; 2,4-dimethoxy - 6 - (β - itaconylhydrazino)-s-triazine; 2-(N,N-dimethylamino)-4-vinylpyrimidine; 2,3-dimethyl-1,3 - butadiene; dimethyl dithiolfumarate; dimethyl fumarate; dimethyl methacryliminodiacetate; dinonyl fumarate; m-divinylbenzene; divinyl sulfide; 1,4-divinyl-2,3,5,6 - tetrachlorobenzene; ethyl α-acetoxyacrylate; ethyl acid fumarate; ethyl acid maleate; ethyleneglycol dimethacrylate; ethyl β-ethoxyacrylate; ethyl methacrylylaminoacetate; ethyl vinyl ether; 5 - ethyl-2-vinylpyridine; ethyl sulfide; N-ethyl-N'-vinylurea; 2-fluoro-1,3-butadiene; fumaronitrile; fumaryl chloride; glycidyl methacrylate; hydronopyl acrylate; p-iodostyrene; isobutyl vinyl ether; isopropyl vinyl ether; maleonitrile; methacrolein; 4 - methacryloxybenzylidene - aniline; 4-methacryloxybenzylidene-4'-chloroaniline; methacryloxymethylpentamethyldisiloxane; N-methacryloyl - e - caprolactam; methallylacetate; methallyl chloride; p-methoxystyrene; methyl acid maleate; methyl a-chloroacrylate; methyl thiolacrylate; methyl vinyl ketone; 2 - methyl-5-vinylpyridine; methyl vinyl sulfide; methyl vinyl sulfone; methyl vinyl sulfoxide; N-methyl - N - vinyl-p-toluenesulfonamide; pentachlorophenyl vinyl sulfide; phenyl vinyl sulfide; phenyl vinyl sulfone; poly(1,3-butyleneglycol fumarate); poly(ethyleneglycol fumarate); p-potassium styrenesulfonate; n-propyl crotonate; sodium acrylate; sodium methacrylate; sodium styrene sulfonate; sodium vinylsulfonate; triethoxyvinylsilane; triethyl aconitate; N,N,N-triethyl-N-(2-methacryloxyethyl) - ammonium iodide; trimethoxyvinylsilane; trimethyl aconitate; trimethylsiloxyvinyldimethylsilane; trimethylvinylsilane; triisopropoxyvinylsilane; tris(trimethylsiloxy)vinylsilane; vinyl acetylene; vinyl benzoate; vinyl butyrate; vinyl caprate; vinyl caproate; vinyl isocaproate; vinyl capryylate; 9-vinylcarbazole; vinyl chloroacetate; vinylcyclohexene; vinyl dichloroacetate; vinylene carbonate; vinyl 2-ethylhexanoate; vinyl formate; vinyl isocyanate; vinyl isothiocyanate; vinyl laurate; vinyl levulinate; 2-vinylmercaptabenzothiazole; 1-vinylnaphthalene; 2 - vinylnaphthalene; N - vinyl - 2-oxazolidinone; vinyl palmitate; vinyl pelargonate; vinyl perfluorobutyrate; 2-vinylphenanthrene; 3-vinylphenanthrene; m-vinylphenol; vinyl pinonate; 2 - vinylpyridine; 4 - vinylpyridine; 4 - vinylpyrimidine; N - vinylpyrrolidone; 2- vinylquinoline; vinyl; vinyl stearate; N-vinylsuccinimide; vinylsulfonic acid; vinyl thiolacetate; 2- vinylthiophene; vinyl trifluoroacetate; vinyl undecylenate; N-vinylurethane; and the like.

The reaction between keratin fibers and ethylenically unsaturated compounds most readily take place in the presence of water. This generally presents no problem since only small amounts are necessary for this improvement and since the catalyst components and/or monomers are generally applied to the fibers in an aqueous medium. If the substrate is dry at the time of treatment, the reaction rate will be slower. Consequently, it is preferred that the substrate be wet with water when the reaction takes place. Ionic or non-ionic surface active agents may be utilized in any aqueous medium used in applying the reagents.

The improved polymerization process of this invention may be conducted on woven, nonwoven, or knitted fabrics of any type, dyed or undyed, provided of course that the dyes are stable to the reagents utilized. The process is also applicable to the treatment of top, tow, roving, rope, thread, yarn or any other fibrous form.

While the process of this invention is particularly adapted to fibrous substrates composed essentially of keratin fibers, particularly those composed entirely of wool fibers, it is also applicable to substrates wherein synthetic or other natural fibers are blended with keratin components and to blends with other keratin fibers such as mohair, alpaca, cashmere, vicuna, guanaco, camel's hair, silk, llama and the like. The preferred synthetic fibers include those produced from polyamides, such as poly(hexamethylene adipamide); polyesters, such as poly(ethylene terephthalate); and acrylic fibers such as acrylonitrile homopolymers or copolymers containing at least about 85% combined acrylonitrile, such as acrylonitrile-methylacrylate (85/15); and cellulosics, such as cellulose acetate and viscose rayon. Of the natural fibers which may be blended with the keratin fibers, cotton is preferred.

The fibrous substrate may be exposed to the monomer in vapor or liquid form including solutions and emulsion. Exposure to the vapors of the monomers is conveniently carried out by entraining the vapor in an oxygen free gas such as carbon dioxide or nitrogen, and then interposing the substrate in a stream of the gas and vapor. Inert volatile liquids, such as water or an alcohol, may be mixed with the compound being vaporized. Similarly, the fibrous substrate may be immersed in a liquid system, either solution or emulsion type, containing the desired amount of monomer.

The reaction is generally conducted at a temperature between about 40° and about 60° C., although room temperatures are also suitable. A reaction temperature in excess of about 100° C. is generally not preferred in that some of the preferred redox catalyst systems may degrade rapidly at that temperature level.

In applying the catalyst components, swelling agent or monomeric compound, either an ionic or a non-ionic surface-active agent may be utilized. In general, such conditions as concentrations of the reagents, pH, time and temperature of reaction may be modified to suit the individual circumstances.

The following examples illustrate preferred embodiments of the present invention:

EXAMPLE I

A 200 yd. skein of worsted yarn is extracted with chlorophene, and then filter paper blotted to a 68% wet pickup of the following freshly prepared solution:

| | |
|---|---|
| Water | gms__ 70 |
| Urea | gms__ 30 |
| Ammonium persulfate | gms__ 6 |
| Ammonium metabisulfite | gms__ 4 |
| 1% ferrous ammonium sulfate | gms__ 0.80 |
| Surfonic N-95 | drops__ 6 |

The skein is then freely suspended in three festoons in a three-liter glass reactor equipped with a flitted glass-tipped supply tube discharging close to the bottom of the reactor and an extra tube at the top. The reactor is completely immersed in a water bath at 52–55° C. Acrylonitrile vapor is injected by bubbling moist carbon dioxide at 125 milliliters per minute through a generator in the water bath containing 90 milliliters acrylonitrile and 10 milliliters distilled water. The reactor is vented through a water-cooled condenser and the unreacted acrylonitrile is collected. After reacting for two hours, the skein is scoured with Tide detergent at room temperature, well rinsed and dried. The gain in weight (dry yarn basis) is 52.6%. Despite this increase in weight, the yarn still has the soft hand characteristic of wool and is further characterized by an improved elastic recovery and increased yarn diameter.

EXAMPLE II

A 200 yard skein of yarn is immersed in a catalyst solution of the same composition as in Example I for 10 minutes, squeezed out and immersed in distilled water for 30 seconds. After filter paper pressing immediately to about 70 to 80% wet pickup, the skein is immersed in a reactor as in Example I and treated with acrylonitrile for about four hours. After scouring, rinsing and drying as in Example I, the following yarn properties are measured and compared with the properties of the yarn prior to treatment.

| | Treated | Untreated |
|---|---|---|
| Breaking strength, grams | 828 | 587 |
| Elongation at the break, percent | 10.7 | 10.1 |
| Elastic recovery, percent | 90 | 71 |

The treated yarn is weighed and found to have increased in weight by 74%. A similar skein of yarn treated in a similar manner but without the urea swelling agent picks up about 55% in weight. More importantly, however, the yarn treated in accordance with this invention, despite the higher pickup of acrylonitrile at 74% has a more desirable hand than the fairly harsh and boardy hand characterizing the yarn treated without a swelling agent.

EXAMPLE III

The procedure of Example II is repeated in three separate experiments, the percentage of urea in the catalyst solutions being 20, 30 and 40%, respectively. The percentage of acrylonitrile pickup on the yarn in these experiments is 31, 50 and 25, respectively, indicating that the optimum level for this particular catalyst system and monomer is about 30% by weight of the urea.

EXAMPLE IV

The procedure of Example II is repeated except that 1 lb. of worsted wool top is substituted for the yarn of Example II. The percentage of acrylonitrile picked up in this instance is 55%.

EXAMPLE V

Worsted wool yarn (1 lb., single ply, 34 count with 15½ turns per inch) is wound onto a perforated dye tube, scoured with Surfonic N-95, rinsed and centrifuged. The resulting package is then impregnated with the following catalyst solution:

|   | Gms. |
|---|---|
| Sodium metabisulfite | 2.0 |
| Ammonium persulfate | 3.0 |
| Urea | 30 |
| Water | 70 |

After 12 minutes immersion in this catalyst solution, the package is centrifuged to 80% wet pickup and placed in a sealed reactor provided with connections at the bottom and top thereof leading to a source of acrylonitrile solution. The connections are such that the acrylonitrile solution may be fed into the bottom of the reactor into the perforated dye tube or into the top of the reactor, the dye tube being closed at the top so that the acrylonitrile solution must pass through the package into the perforated tube and out the bottom when the feed-in is from the top. This type feed is designated as outside-in feed, whereas feed from the bottom of the reactor into the perforated tube, through the package and out the top of the reactor is designated as inside-out feed. The acrylonitrile solution is passed repeatedly through the package in cycles of 6 minutes inside-out and 4 minutes outside-in for four hours.

After scouring, rinsing and drying, the yarn is measured to have picked up 60% by weight of the acrylonitrile. The following yarn properties are measured:

|   | Treated | Untreated |
|---|---|---|
| Breaking strength, dry, grams | 173 | 133 |
| Breaking strength, wet, grams | 127 | 118 |
| Elongation at the break, dry, percent | 32.5 | 26.3 |
| Elongation at the break, wet, percent | 56.9 | 45.7 |

It has been shown that, by the use of a swelling agent in accordance with this invention, the amount of polymer which may be added to a substrate containing wool fibers under any given set of conditions is materially increased. This increase in weight most surprisingly does not involve an additional sacrifice in aesthetic properties of the wool. Furthermore, the physical properties of the treated substrate, particularly the elastic recovery, is also considerably improved.

The increased weight of monomeric materials which can be provided in accordance with this invention provides the practitioner with a tool for enhancing the properties he desires. For example, if the monomeric material, such as acrylic acid, provides the keratin substrate, after polymerization, with such properties as immunity to acid dyes, then this immunity will be considerably increased.

It has also been discovered that, for a given level of pickup of reacted material, the volume of fibers treated in accordance with this invention is greater than that of fibers which were reacted in the absence of a swelling agent. For example, a fiber containing 50% of reacted acrylonitrile in the presence of urea would have a greater volume than the same fiber containing 50% of reacted acrylonitrile, but which had been reacted in the absence of urea. These and other advantages will become apparent to those skilled in the art as a practice of the process of this invention.

That which is claimed is:

1. In the process for modifying the characteristics of keratin fibers by reaction therewith of ethylenically unsaturated compounds, the improvement which comprises treating the fibers with an aqueous system containing a swelling agent for said fibers selected from the class consisting of urea, guanadine compounds, amides, thiourea, phenol, and inorganic lithium salts and maintaining the said fibers in a swollen state while conducting the reaction.

2. The process improvement of claim 1 wherein the reaction is conducted in the presence of a redox catalyst system.

3. The process improvement of claim 2 wherein the fibers are treated with a swelling agent no later than the treatment of the fibers with the catalyst system.

4. The process improvement of claim 1 wherein the swelling agent comprises urea.

5. The process improvement of claim 1 wherein the ethylenically unsaturated compound comprises acrylonitrile.

6. A method of modifying the characteristics of keratin fibers comprising impregnating said fibers with an aqueous system containing a swelling agent for said fibers and reacting said fibers selected from the class consisting of urea, guanadine compounds, amides, thiourea, phenol, and inorganic lithium salts with a monomeric material containing a

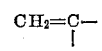

group, said fibers being maintained in a swollen state during the reaction.

7. A method of modifying the characteristics of keratin fibers comprising impregnating said fibers with an aqueous system containing at least one component of a redox catalyst system and a swelling agent for said fibers selected from the class consisting of urea, guanadine compounds, amides, thiourea, phenol, and inorganic lithium salts, applying to said fibers the remaining component of the catalyst system if any, and reacting a monomeric material containing a

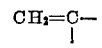

group with said fibers while maintaining the fibers in a swollen state during the reaction.

8. The process of claim 6 wherein the swelling agent comprises urea.

9. The process of claim 6 wherein the reaction between the keratin fibers and the monomeric material is conducted in the presence of a redox catalyst system.

10. An improved graft polymerization process for modifying the characteristics of keratin fibers comprising impregnating said keratin fibers with an aqueous solution containing from about 20 to about 35% by weight of urea and a redox catalyst system to swell said keratin fibers substantially; and exposing said keratin fibers to an ethylenically unsaturated compound while maintaining said fibers in a swollen state during reaction of said ethylenically unsaturated compound with said fibers, said fibers thereby having a greater volume than keratin fibers reacted to the same level with said ethylenically unsaturated compound but in the absence of urea.

11. The process of claim 10 wherein the keratin fibers increase in weight by at least about 50% as a result of reaction with said ethylenically unsaturated compound.

12. Keratin fibers produced in accordance with the process of claim 10.

13. Keratin fibers produced in accordance with the process of claim 11.

References Cited

UNITED STATES PATENTS

| 2,406,412 | 8/1946 | Speakman et al. | 117—141 |
|---|---|---|---|
| 2,940,869 | 6/1960 | Graham. | |
| 2,956,899 | 10/1960 | Cline. | |
| 3,005,730 | 10/1961 | Pardo | 117—141 |
| 3,008,920 | 11/1961 | Urchick. | |
| 3,083,118 | 3/1963 | Bridgeford. | |
| 3,291,560 | 12/1966 | Machell et al. | 8—127.6 X |

FOREIGN PATENTS 818,412   8/1959   Great Britain.

NORMAN G. TORCHIN, Primary Examiner

J. CANNON, Assistant Examiner

U.S. Cl. X.R.

8—115.7, 127.6, 128; 117—141

PO-1050
(5/69)

UNITED STATES PATENT OFFICE
CERTIFICATE OF CORRECTION

Patent No. 3,475,114  Dated October 28, 1969

Inventor(s) Edgar Dare Bolinger and Willard L. Morgan

It is certified that error appears in the above-identified patent and that said Letters Patent are hereby corrected as shown below:

In Column 1, line 69, "guanidine" should read --guanadine--.
In Column 2, line 65, "sulfoxylate" should read --sulfoxylates--.
In Column 6, line 32, "Ammonium metabisulfite" should read --Sodium metabisulfite--.

SIGNED AND
SEALED
FEB 24 1970

(SEAL)
Attest:

Edward M. Fletcher, Jr.
Attesting Officer

WILLIAM E. SCHUYLER, JR.
Commissioner of Patents